(12) United States Patent
Takahashi (10) Patent No.: US 10,486,851 B2
(45) Date of Patent: Nov. 26, 2019

(54) PRESSURE-RESISTANT GLASS SPHERE

(71) Applicant: Okamoto Glass Co., Ltd., Kashiwa-shi, Chiba (JP)

(72) Inventor: Hiroshi Takahashi, Kashiwa (JP)

(73) Assignee: Okamoto Glass Co., Ltd., Kashiwa-shi, Chiba (JP)

( * ) Notice: Subject to any disclaimer, the term of this patent is extended or adjusted under 35 U.S.C. 154(b) by 140 days.

(21) Appl. No.: 15/795,256

(22) Filed: Oct. 27, 2017

(65) Prior Publication Data
US 2018/0044056 A1    Feb. 15, 2018

Related U.S. Application Data

(63) Continuation of application No. PCT/JP2016/070367, filed on Jul. 11, 2016.

(30) Foreign Application Priority Data

May 6, 2016  (JP) .................................. 2016-093167

(51) Int. Cl.
*B65D 13/02*   (2006.01)
(52) U.S. Cl.
CPC .................................... *B65D 13/02* (2013.01)
(58) Field of Classification Search
CPC ................................... B65D 13/02; B63G 8/00
See application file for complete search history.

(56) References Cited

U.S. PATENT DOCUMENTS

| | | |
|---|---|---|
| 3,283,348 A | 11/1966 | Farmer et al. |
| 3,450,082 A | 6/1969 | Demarest, Jr. |
| 3,563,089 A | 2/1971 | Henderson |

(Continued)

FOREIGN PATENT DOCUMENTS

| | | |
|---|---|---|
| JP | S53-146716 A | 12/1978 |
| JP | 2003-517571 A | 5/2003 |

(Continued)

OTHER PUBLICATIONS

International Search Report for PCT/JP2016/070367 dated Sep. 27, 2016.

(Continued)

*Primary Examiner* — Jeffrey R Allen
(74) *Attorney, Agent, or Firm* — Yokoi & Co., U.S.A.; Toshiyuki Yokoi (57) ABSTRACT

In a pressure-resistant glass sphere used for exploration of deep sea, ocean floor or the like, it is an important issue to reduce weight and increase a floating force while keeping pressure resistance capable of withstanding high water pressure of deep sea or the like and being used repeatedly. A pressure-resistant glass sphere of the present invention is composed of a pair of glass-made hollow hemispherical bodies, wherein the glass-made hollow hemispherical bodies are joined with each other at ground joint surfaces located on an equatorial plane of the pressure-resistant glass sphere so that the ground joint surfaces serve as a joining surface, and characterized in that a thickness of a spherical shell of the glass-made hollow hemispherical bodies is thicker at an equatorial plane portion than the portion other than the equatorial plane portion having a predetermined width from the ground joint surfaces.

5 Claims, 9 Drawing Sheets

(56) References Cited

U.S. PATENT DOCUMENTS

| | | | |
|---|---|---|---|
| 3,587,122 A | 6/1971 | Humphrey et al. | |
| 3,713,412 A * | 1/1973 | Ianuzzi | B63G 8/00 |
| | | | 114/312 |
| 2001/0018302 A1 | 8/2001 | Jochmann et al. | |

FOREIGN PATENT DOCUMENTS

| | | | |
|---|---|---|---|
| JP | 2010-038854 A | 2/2010 |
| JP | 5313400 B | 10/2013 |

OTHER PUBLICATIONS

PCT written opinion dated Sep. 27, 2016.
Development of Deep Sea Camera System Using Hollow Glass Sphere, Report of Japan Marine Science and Technology Center No. 1, p. 26 to 31, 1977.
A Self-Buoyant Free-Fall Deep Sea Camera System Using Submersible Glass Sphere, JAMSTECTR 3, 1979.
Flotation (Glass Spheres), http://teledynebenthos.com/product/flotation_instrument_housings/flotation-glass-spheres.
VIROVEX—glass instrumentation housings, http://www.nautilus-gmbh.com/fileadmin/images_nautilus/002_VITROVEX/Instruments/Data_sheets/140101_VITROVEX_deep_sea_instrumentation_housings.pdf.

* cited by examiner

PRESSURE-RESISTANT GLASS SPHERE

CROSS-REFERENCES TO RELATED APPLICATIONS

This Application claims the benefit of priority and is a Continuation application of the prior International Patent Application No. PCT/JP2016/070367, with an international filing date of Jul. 11, 2016, which designated the United States, and is related to the Japanese Patent Application No. 2016-093167, filed May 6, 2016, the entire disclosures of all applications are expressly incorporated by reference in their entirety herein.

BACKGROUND OF THE INVENTION

Field of the Invention

The present invention relates to a pressure-resistant glass sphere capable of being used for exploration and searching in the deep sea, the ocean floor, the underground, the thick ice of the Antarctic Continent or the like by housing observation apparatuses and measurement apparatuses or the like such as a camera, a video camera and a seismometer in the pressure-resistant glass sphere.

Description of Related Art

In order to explore and search the deep sea, the ocean floor, the underground, the thick ice of the Antarctic Continent or the like by using the camera, the video camera, the seismometer or the like, a pressure-resistant container for storing the observation apparatuses and the measurement apparatuses is required. Conventionally, high strength metal material such as Titanium alloy is used.

More recently, a pressure-resistant container made of glass is also used instead of the metal material to reduce weight. Although the glass may be easily destroyed under tensile stress, the glass has extremely high strength with respect to compressive stress. Such features can be utilized when using the glass. It is discussed that a photomultiplier is incorporated in the pressure-resistant container made of glass in the thick ice of the Antarctic Continent for detecting elementary particles from space.

In addition, one of the great advantages of the glass is that the glass is transparent different from metal material and ceramic material. Because of this, the condition of the ocean floor and the deep sea can be visually observed by using the housed camera, video camera or the like.

Non-Patent Document 1 relates to prototype of a deep sea camera system using a pressure-resistant glass sphere. Non-Patent Document 1 describes that the glass sphere began to be used as the pressure-resistant container from around 1964 in America, however, there were problems of the state of the surface finishing, for example, thus, the pressure-resistant glass sphere was developed and tested with the cooperation of a Japanese glass manufacturer. Two kinds of glass spheres were developed and tested: one is the grass sphere having an outer diameter of 36 cm and an inner diameter of 32 cm; and the other is the grass sphere having an outer diameter of 36 cm and an inner diameter of 33 cm.

Non-Patent Document 2 describes a free-fall deep sea camera system using the glass sphere having an outer diameter of 36 cm and a thickness of 1.5 cm described in Non-Patent Document 1 and the glass sphere having an outer diameter of 26 cm and a thickness of 1 cm.

Patent Document 1 discloses a housing for a marine measuring instrument using a pair of glass-made hollow hemispherical bodies. However, two glass-made hollow hemispherical bodies are joined with each other via a protect cage without being directly in contact with each other at circular openings (ground joint surfaces).

Patent Document 2 points out that the technology of Patent Document 1 has problems of high material cost, high operation cost and low seal reliability by sealing. In order to improve the above described problems, Patent Document 2 discloses the technology of polishing the ground joint surfaces precisely (±4 μm), applying non-hardenable material on an equatorial plane joining portion which is located outside the ground joint surfaces, and covering the equatorial plane joining portion with an adhesive tape as a means for preventing the collapse caused by sea water invasion under high pressure in the deep sea.

Patent Document 3 discloses a pressure-resistant glass body formed by joining a pair of hollow hemispherical bodies at ground joint surfaces where the hollow hemispherical bodies are joined with each other by an adhesive bonding layer consisting of a curable adhesive agent applied to the ground joint surfaces. In the technology disclosed in Patent Document 2, the ground joint surfaces need to be polished precisely and there is a risk of positional deviation when two hollow hemispherical bodies are joined with each other. In order to prevent and solve the above described problems, two hollow hemispherical bodies are adhered with each other by the curable adhesive agent.

Patent Document 4 relates to a pressure-resistant structure formed by fitting a pair of glass-made hollow hemispherical bodies with each other at the ground joint surfaces, characterized in that a metal film is formed on at least one of the ground joint surfaces. In the technology disclosed in Patent Document 3, the ground joint surfaces are joined with each other by the adhesive bonding layer consisting of the curable adhesive agent. Because of this, when the pressure-resistant glass body is collected after the deep sea observation, the adhesive bonding layer should be destroyed to take out the housed observation apparatuses or the like. Thus, Patent Document 4 has a purpose to solve the problem that the pressure-resistant glass body can be used only once. Namely, Patent Document 4 advocates the merit that the observation apparatuses housed inside can be collected and the pressure-resistant structure can be repeatedly used without destroying the pressure-resistant structure after the deep sea observation by using the metal film instead of the adhesive bonding layer.

In addition, when the pressure-resistant structure is repeatedly used, the processes of pressurization (deep sea) →depressurization (ground)→pressurization→depressurization are repeated on the ground joint surfaces. Because of this, the ground joint surfaces are cracked or peeled. Patent Document 4 can solve the above described problem by reinforcing the ground joint surfaces with the metal film to prevent the occurrence of the crack and the peeling.

Patent Document 5 relates to an outer shell of a pressure-resistant container, a pressure-resistant container and an exploration apparatus, the pressure-resistant container being formed of ceramic and having a through hole. Patent Document 5 discloses the outer shell formed by a convex outer shell portion made of ceramic, characterized in that a thickness is large at a portion continuing from the outer shell portion and having the through hole in the thickness direction.

Non-Patent Document 3 is a technical specification of Floatation Glass Sphere for deep sea manufactured by Teledyne Benthos in U.S.A. The glass sphere having an outer diameter of 13 inch (33 cm), an inner diameter of 12 inch (30.5 cm), a weight of 9.07 kgf and a floating force of 10.4 kgf, and the glass sphere having an outer diameter of 17 inch (43.2 cm), an inner diameter of 15.9 inch (40.4 cm), a weight of 17.7 kgf and a floating force of 25.4 kgf are disclosed. Here, the floating force is a value obtained by subtracting the weight of the glass sphere from the buoyancy obtained by the glass sphere.

Patent Document 4 is a data sheet related to the glass sphere manufactured by Nautilus Marine Service GmbH in Germany. The glass sphere having an outer diameter of 17 inch (432 mm), a thickness of the spherical shell of 21 mm, 18 mm and 14 mm and the glass sphere having an outer diameter of 13 inch (330 mm) and a thickness of the spherical shell of 12 mm are disclosed, for example.

Patent Document 1: U.S. Pat. No. 3,563,089
Patent Document 2: U.S. Pat. No. 3,587,122
Patent Document 3: Japanese Unexamined Patent Application Publication (Translation of PCT Application) No. 2003-517571
Patent Document 4: Japanese Unexamined Patent Application Publication No. 2010-38854
Patent Document 5: Japanese patent No. 5313400
Non-Patent Document 1: About a test of a deep sea camera system using a pressure-resistant glass sphere, Report of Japan Marine Science and Technology Center No. 1, p. 26 to 31, 1977
Non-Patent Document 2: 4. Deep sea camera system including free-fall pressure-resistant glass sphere, JAMSTECTR 3, 1979
Non-Patent Document 3: http://teledynebenthos.com/product/flotation_instrument_housings/flotation-glass-spheres
Non-Patent Document 4: http://www.nautilus-gmbh.com/fileadmin/images_nautilus/002_VITROVEX/Instruments/Data_sheets/140101_VITROVEX_deep_sea_instrumentation_housings.pdf

BRIEF SUMMARY OF THE INVENTION

In Non-Patent Document 1, the pressure-resistant glass sphere having a weight-in-air of 16 kgf and an effective buoyancy (floating force) of 8 kgf and the pressure-resistant glass sphere having a weight-in-air of 12.5 kgf and an effective buoyancy (floating force) of 12.5 kgf are described. The maximum arrival depth of the deep sea camera system using these pressure-resistant glass spheres is described as 5,810 m.

In Non-Patent Document 2, it is described that the deep sea camera system including a free-fall pressure-resistant glass sphere using a large pressure-resistant glass sphere having an outer diameter of 36 cm, a thickness of 1.5 cm, a weight-in-air of 12.5 kgf and an effective buoyancy (floating force) of 12.5 kgf has a pressure resistance corresponding to the water depth of 6,700 m. In addition, it is described that deep sea organism was actually photographed at the water depth of 3,400 m and the deep sea camera system was successfully collected. It is recorded that a floating speed was 1.1 m/s when the deep sea camera system was collected. In addition, it is recorded that the deep sea camera system using a small glass sphere having an outer diameter of 26 cm, a thickness of 1 cm and an effective buoyancy of 4.7 kgf passed a pressure resistance test at the water depth of 6000 m. After that, it is suggested that an increase in the floating force is important to efficiently explore and search the deep sea and collect the system by reducing the weight of the pressure-resistant glass sphere. In addition, it is described that there are still a lot of doubts about the number of times of continuous use of the pressure-resistant glass sphere at the deep sea.

Although the glass sphere is used in the technology disclosed in Patent Document 1, there is a problem pointed out in Patent Document 2 since the glass sphere is not the ground joint type.

In the technology disclosed in Patent Document 2, polishing processing should be performed on the ground joint surfaces with high accuracy and seal processing should be performed around an equatorial plane. In addition, the pressure resistance test of the pressure-resistant glass sphere is performed under 10,000 p.s.i (approximately 69 MPa). This corresponds to the water depth of approximately 6,900 m.

In the technology disclosed in Patent Document 3, since the curable adhesive agent is used as described above, there is a problem that it is difficult to be used repeatedly. In addition, the operating depth is preferably up to 7,000 m.

In the technology disclosed in Patent Document 4, the metal film is formed on the ground joint surfaces to reinforce the ground joint surfaces. Thus, the occurrence of the crack and the peeling is suppressed at the ground joint surfaces. However, the pressurizing and depressurizing test is performed by pressurizing up to 60 MPa in four minutes, depressurizing in the next four minutes, and repeating the pressurizing and depressurizing 50 times. This test assumes the exploration and searching at the water depth of 6,000 m and the collection after that.

In the technology disclosed in Patent Document 5, the thickness of the through hole portion is increased to improve the strength of the through hole portion. Thus, the exploration and searching is enabled at the deep sea of up to approximately 11,000 m. However, Patent Document 5 relates to the outer shell of the pressure-resistant container made of an opaque ceramic. In the pressure-resistant glass sphere, it is difficult to make a through hole at a part of the spherical shell and the thickness is increased at the part of the through hole. In addition, there is a problem that this doesn't increase the strength of the ground joint surfaces.

In the product examples described in Non-Patent Documents 3 and 4, the floating force is small when the glass sphere having an outer diameter of 10 inch or an outer diameter of 13 inch is used. Similarly, although the product lineup includes the glass sphere having an outer diameter of approximately 17 inches used for the depth of approximately 9,000 m and approximately 12,000 m, the floating force is insufficient compared to the one for approximately 7,000 m. Thus, it takes time to collect the glass sphere from the deep sea.

As can be seen from the above described prior arts and conventional examples, in the pressure-resistant glass sphere of the present invention, it is an important issue to reduce the weight and increase the floating force while keeping the pressure resistance capable of withstanding high water pressure and being used repeatedly.

The present invention relates to a pressure-resistant glass sphere comprising a pair of glass-made hollow hemispherical bodies, the glass-made hollow hemispherical bodies being joined with each other at ground joint surfaces located on an equatorial plane of the pressure-resistant glass sphere so that the ground joint surfaces serve as a joining surface, wherein a thickness of a spherical shell of the glass-made hollow hemispherical bodies is thicker at an equatorial plane portion than the portion other than the equatorial plane portion, the equatorial plane portion having a predetermined width from the ground joint surfaces. Here, the glass-made hollow hemispherical bodies are, in other words, glass-made hemispherical bodies having the ground joint surfaces at the equatorial plane of the hemisphere. The spherical shell is a portion formed of glass in the glass-made hollow hemispherical bodies.

The present invention is based on the fact that the pressure-resistant glass sphere is cracked or peeled at the ground joint surfaces and the collapse of the entire pressure-resistant glass sphere is caused from the crack and the peeling in the deep sea.

In the present invention, the thickness of the spherical shell is not necessarily increased at all portions of the pressure-resistant glass sphere. In order to improve the strength, the thickness of the spherical shell is specified to be thicker only at the equatorial plane portion having a predetermined width from the equatorial plane (ground joint surfaces) than the thickness of the spherical shell of the portion other than the equatorial plane portion since the equatorial plane portion affects the strength of the glass sphere. Thus, while the increase in weight is prevented, the floating force is increased and the strength is improved.

In the present invention, it is preferred that the thickness of the spherical shell of the equatorial plane portion having the predetermined width from the ground joint surfaces of the glass-made hollow hemispherical bodies is thicker totally by 0.5 mm or more outward from an outer diameter and inward from an inner diameter than the thickness of the spherical shell of the portion other than the equatorial plane portion. Namely, it is preferred that the outer diameter of the spherical shell of the equatorial plane portion including the ground joint surfaces is thicker by 0.5 mm or more outward from the outer diameter of the spherical shell of the other portion. Alternatively, the outer diameter of the spherical shell of the equatorial plane portion including the ground joint surfaces is thicker by 0.5 mm or more inward from the inner diameter of the spherical shell of the other portion. Alternatively, for example, the outer diameter is thicker by 0.25 mm or more outward and thicker by 0.25 mm or more inward so that the outer diameter is thicker totally by 0.5 mm or more.

As a concrete embodiment of the pressure-resistant glass sphere of the present invention, the outer diameter of the pair of the glass-made hollow hemispherical bodies is 330 mm, the thickness of the spherical shell of the portion other than the equatorial plane portion is 17 mm, the thickness of the spherical shell of the equatorial plane portion is thicker by 0.25 mm or more outward from the outer diameter and thicker by 0.25 mm or more inward from the inner diameter.

As another concrete embodiment of the pressure-resistant glass sphere of the present invention, the outer diameter of the pair of the glass-made hollow hemispherical bodies is 330 mm, the thickness of the spherical shell of the portion other than the equatorial plane portion is 16 mm, the thickness of the spherical shell of the equatorial plane portion is thicker by 0.5 mm or more outward from the outer diameter and 0.5 mm or more inward from the inner diameter than the thickness of the spherical shell of the portion other than the equatorial plane portion.

In the above described two concrete embodiments, the outer diameter of 330 mm is same as the outer diameter of 13 inch which is described in the conventionally known example. Thus, the outer diameter is not strictly limited to 330 mm. The glass sphere having an outer diameter difference of several millimeters is also included in these concrete examples. When the thickness of the spherical shell is 17 mm or 16 mm, the thickness is not strictly limited to 17 mm or 16 mm. Normally, a margin for error of within ±0.5 mm is allowable.

As another concrete embodiment of the pressure-resistant glass sphere of the present invention, the outer diameter of the pair of the glass-made hollow hemispherical bodies is 432 mm, the thickness of the spherical shell of the portion other than the equatorial plane portion is 20 mm, and the thickness of the spherical shell of the equatorial plane portion is thicker outward from the outer diameter and inward from the inner diameter so that the thickness is thicker totally by 0.5 mm or more than the thickness of the spherical shell of the portion other than the equatorial plane portion. In the above described concrete embodiment, the outer diameter of 432 mm is same as the outer diameter of 17 inch which is described in the conventionally known example. Thus, the outer diameter is not strictly limited to 432 mm. The glass sphere having an outer diameter difference of several millimeters is also included in this concrete example.

As another concrete embodiment of the pressure-resistant glass sphere of the present invention, the outer diameter of the pair of the glass-made hollow hemispherical bodies is 250 mm, the thickness of the spherical shell of the portion other than the equatorial plane portion is 8 mm, and the thickness of the spherical shell of the equatorial plane portion is thicker outward from the outer diameter and inward from the inner diameter so that the thickness is thicker totally by 0.5 mm or more. In the above described concrete embodiment, the outer diameter of 250 mm is same as the outer diameter of 10 inch which is described in the conventionally known example. Thus, the outer diameter is not strictly limited to 250 mm. The glass sphere having an outer diameter difference of several millimeters is also included in this concrete example. When the thickness of the spherical shell is 8 mm, a margin for error of within ±0.5 mm is allowable.

In the above described glass-made hollow hemispherical bodies forming the pressure-resistant glass sphere, the predetermined width of the equatorial plane portion is preferably 9 mm or more and 130 mm or less (between 9 mm and 130 mm) from the ground joint surfaces (e.g., equatorial plane), the thickness of the spherical shell of the equatorial plane portion being thicker than the thickness of the spherical shell of the portion other than the equatorial plane portion. Namely, the equatorial plane portion is a portion having the width of 9 mm or more and 130 mm or less from the ground joint surfaces (e.g., equatorial plane) and the thickness is thicker at the equatorial plane portion. It is impossible to increase the thickness of the spherical shell only at the equatorial plane (e.g., ground joint surfaces). Thus, the thickness is specified to be thicker within the area of the predetermined width from the equatorial plane (e.g., ground joint surfaces).

The width of the equatorial plane portion is limited to the above described numeral range due to the following reasons. If the width of the equatorial plane portion is less than 9 mm, the effect of increasing the strength obtained by increasing the thickness of the ground joint surfaces may become poor. If the width of the equatorial plane portion is more than 130 mm, the effect of increasing the floating force obtained by reducing the weight of the pressure-resistant glass sphere becomes poor.

In the glass-made hollow hemispherical bodies, a PV value indicating a flatness is preferably 20 μm or less, an average surface roughness Ra is preferably 0.5 μm or less and a verticality is preferably 2 μm or less as surface accuracy of the ground joint surfaces serving as the joining surface. Because of this, the strength of the ground joint surfaces can be further increased while the thickness of the thickness of the spherical shell is kept thin.

Non-Patent Document 2 describes that the polishing accuracy of the ground joint surfaces is ±4 μm. In the present invention, in order to increase the strength of the ground joint surfaces, the surface roughness Ra is specified to be 0.5 μm or less and the verticality is introduced as a new concept. Although the verticality will be explained in detail later, the verticality is based on the idea that the occurrence of the crack and the peeling leading to strength reduction is suppressed as the parallelism (verticality with respect to the tangential line) of the ground joint surfaces increases when two glass spheres are fitted with each other at the ground joint surfaces.

According to the present invention, the pressure resistance is increased while the thickness of the spherical shell of the glass-made hollow hemispherical bodies is kept thin by increasing the thickness of the spherical shell only at the equatorial plane portion having the predetermined width from the ground joint surfaces. Thus, the weight of the entire pressure-resistant glass sphere can be reduced. As a result, the effect of increasing the floating force can be obtained.

DETAILED DESCRIPTION OF THE INVENTION

A glass-made hollow hemispherical body used in the present invention is manufactured by the following processes.

Figure 1A:
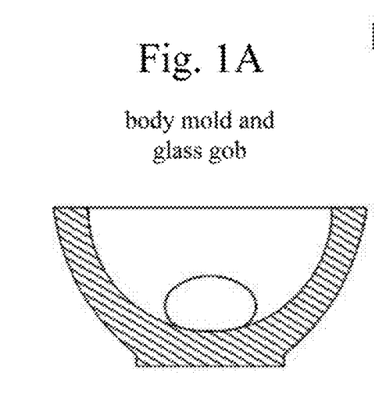
FIGS. 1A to 1E are drawings explaining a manufacturing process of a pressure-resistant glass sphere of the present invention.
Figure 1B:
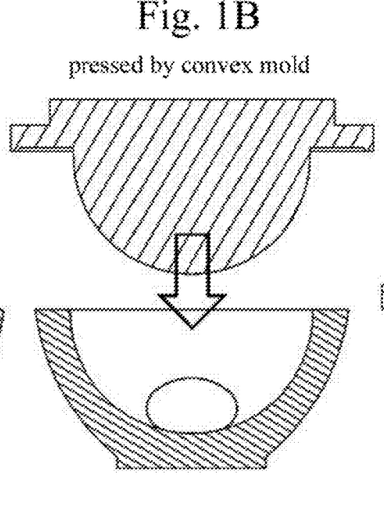
Figure 1C:
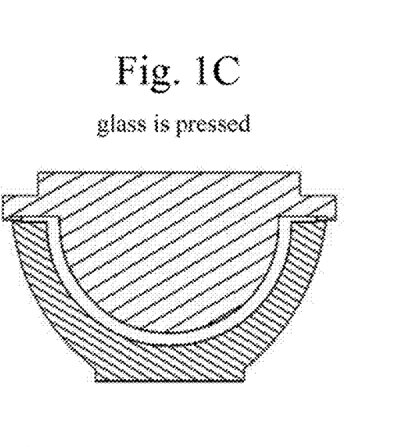

In the molding process, molten glass is molded into a hollow hemispherical shape by using normal direct press technology. As shown in FIGS. 1A to 1C, a lump (glass gob) of molten glass is put into a mold (body mold), a mold (convex mold) is lowered from above, the glass is press-molded, and the shape of the molds is transferred. Thus, a glass-made hollow hemispherical body is obtained.

In the above described stage, outer and inner shapes and surface state of the glass-made hollow hemispherical body are determined. In the present invention, the body mold is widened at the position corresponding to the equatorial plane portion so that the thickness is increased by a predetermined amount, and the convex mold is narrowed at the position corresponding to the equatorial plane portion so that the thickness is increased by a predetermined amount. Consequently, in the pressure-resistant glass sphere, the thickness of the spherical shell of the equatorial plane portion is thicker than the thickness of the spherical shell of the other portion.

Shape accuracy of the mold and surface accuracy of mold surface contacting with the glass are extremely important. Thus, these greatly affect the quality and shape accuracy of the press-molded glass-made hollow hemispherical body. In the present invention, the width of the equatorial plane portion, which is the portion to be thickened, is preferably 9 mm or more and 130 mm or less. Thus, the body mold and the convex mold are processed to have the above described dimension and shape at a portion corresponding to the thick part of the equatorial plane portion of the pressure-resistant glass sphere.

As a material of the glass used for the pressure-resistant glass sphere of the present invention, a borosilicate glass having a specific weight of approximately 2.35 is preferable. This is because the specific weight of the borosilicate glass is smaller than the specific weight of 2.50 of a soda-lime glass which is a more general glass material. Thus, larger floating force is expected to be obtained in the deep sea.

Also from the viewpoint of heat resistance and thermal shock resistance, the material of the glass used for the pressure-resistant glass sphere of the present invention is preferably the borosilicate glass. This is because a linear thermal expansion coefficient of the borosilicate glass is small, i.e., approximately $50 \times 10-7/°$ C. Thus, shape change and thermal stress caused and generated by temperature change are suppressed. In addition, the borosilicate glass is excellent in durability.

Figure 1D:
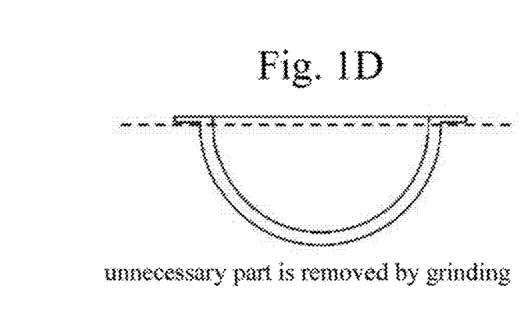

After press molding, the glass-made hollow hemispherical body cooled down gradually to a room temperature is transferred to a working process. First, as shown in FIG. 1D, extra glass protruded by the press molding is removed by using a MC (machining center) working machine. Here, an electrodeposited diamond grinding tool having a number (particle size) of approximately 600 is used, for example. The glass is ground to have a desired dimension by controlling the grinding time. By the above process, a roughly ground joint surface (joining surface) is completed.

Then, thread chamfering is performed on the edge portions of inside and outside the joining surface. This process is manually performed by using a belt sander having a number (particle size) of approximately 600. Fine chipping or the like generated during the grinding process exists on the edge portions of the joining surface of the glass-made hollow hemispherical body. Therefore, the thread chamfering is performed to remove the chipping and prevent the chip, the crack and the peeling during use and handling. When so-called R processing is performed with a large curvature instead of the thread chamfering, it is experimentally confirmed that large stress is generated at the both end portions of the ground joint surface when the pressure is applied. Thus, the thread chamfering having a width of approximately 0.3 to 0.5 mm is appropriate.

Figure 1E:
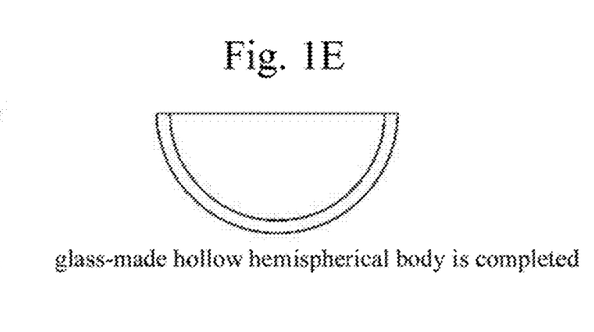

Then, precision polishing of the joining surfaces is performed by the polishing board using emery having a number (particle size) of approximately 1000 to obtain the glass-made hollow hemispherical body shown in FIG. 1E.

Figure 2:
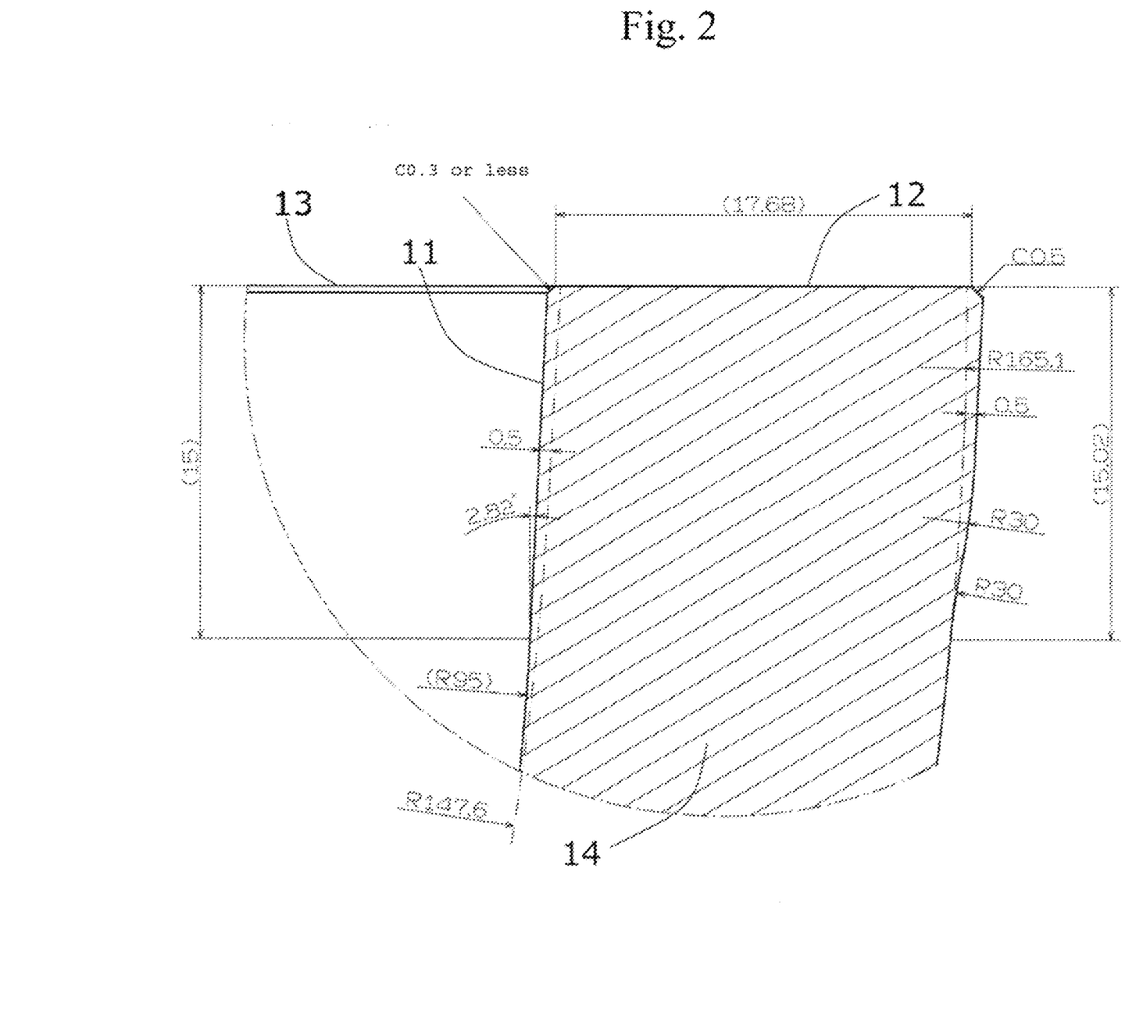
FIG. 2 is a drawing showing ground joint surfaces and an equatorial plane portion of the pressure-resistant glass sphere of the present invention (embodiment 1).

FIG. 2 is a cross-section in the vicinity of the equatorial plane portion of the pressure-resistant glass sphere of the present invention where the thickness of the spherical shell of an equatorial plane portion 11 is thicker by approximately 0.5 mm inward from the inner diameter and thicker by approximately 0.5 mm outward from the outer diameter over the width of approximately 15 mm. Here, the equal plane portion 11 is a portion located near an equatorial plane 13.

In the present embodiment, the thickness of a spherical shell 14 is specified to be 17 mm at the portion other than the equatorial plane portion, the thickness of the spherical shell is gradually increased toward the equatorial plane portion 11, and the thickness of the spherical shell is approximately 18 mm at the equatorial plane portion. The thick part of the outer diameter portion is gradually increased from the portion other than the equatorial plane portion at a curvature of 30 mm. On the other hand, the thick part of the inner diameter portion is gradually increased from the portion other than the equatorial plane portion at a curvature of 95 mm. The description of 2.82° shown in FIG. 2 means that an extremely small taper (inclination of 2.82°) is added so that the glass-made hollow hemispherical body which is press-molded by using the mold can be easily removed from the mold after the press molding.

In the present embodiment, thread chamfering is performed on end portions of ground joint surfaces 12. The width of the thread chamfering is less than 0.3 mm (approximately 0.2 mm) at the inner edge, and 0.5 mm at the outer edge. Consequently, the pair of glass-made hollow hemispherical bodies are joined with each other at the ground joint surfaces having the width of 17.68 mm.

As for the measurement of the surface accuracy and the shape accuracy of the ground joint surfaces 12 (i.e., joining surface), Ra (surface roughness) is measured by using a surface roughness/contour shape measuring machine (Mitutoyo CS-3000), and PV (flatness) and verticality are measured by using a three-dimensional shape measuring machine (Mitutoyo CRT-A C776).

The measuring method of the PV (flatness) and the verticality is as follows. First, the glass-made hollow hemispherical body is set on a sample stage of the three-dimensional shape measuring machine with the equatorial plane up. Then, inclination (levelness) is measured from the positions (heights) of arbitrary four points of the ground joint surface (equatorial plane). The inclination of the equatorial plane is automatically corrected to serve as a reference surface (horizontal surface).

Then, the positions of 36 points of the ground joint surface are measured by dividing the center angle into every 10 degrees, and Peak-to-Valley value, i.e., PV value (flatness), is calculated from the maximum value (Peak) and the minimum value (Valley).

Figure 3:
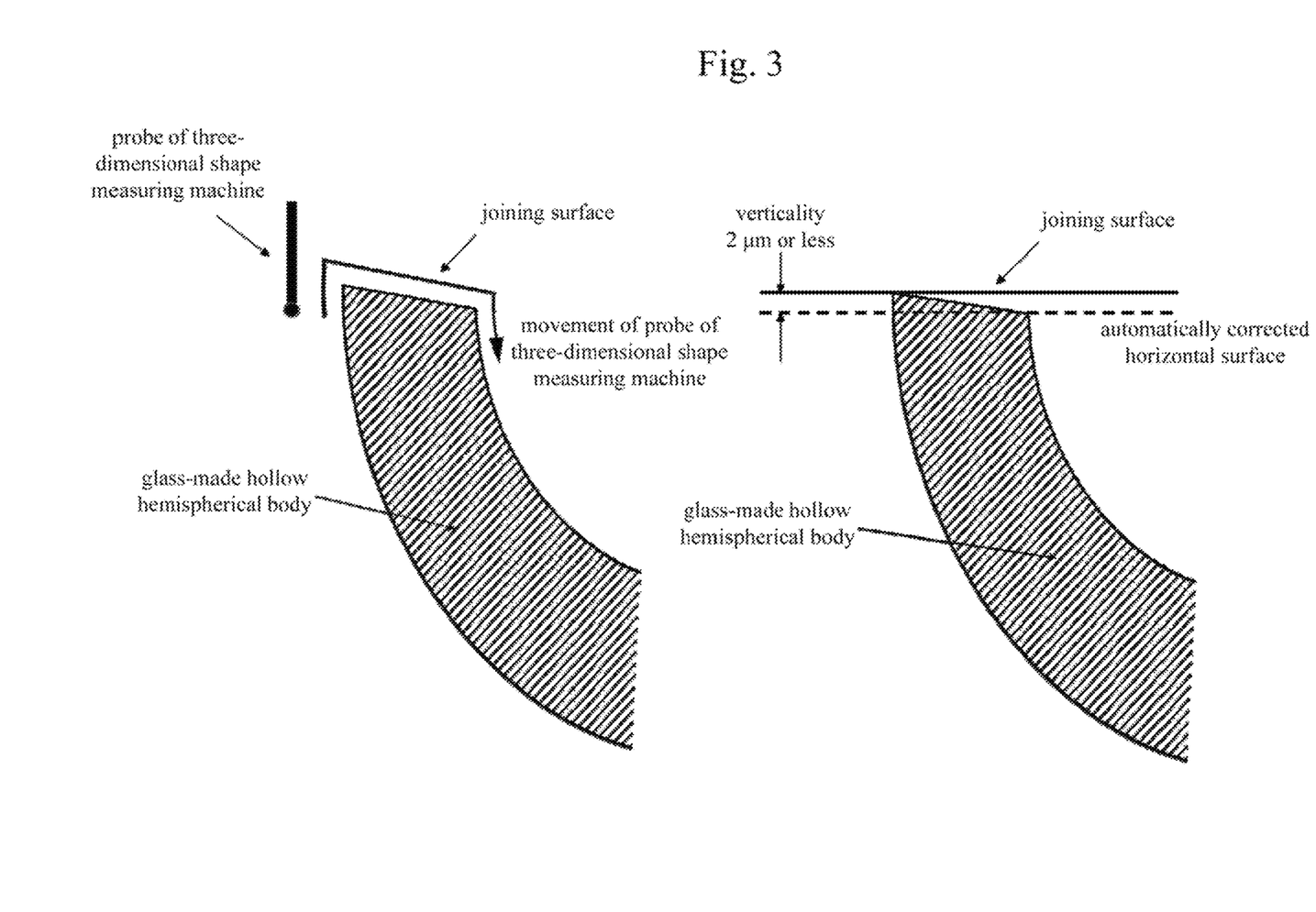
FIG. 3 is a drawing showing a definition and a measuring method of a verticality of the ground joint surfaces in the present invention.

Furthermore, as shown in FIG. 3, the verticality is measured by running a probe from the outside of the glass sphere, thorough the ground joint surfaces to the inside of the glass sphere at eight points the center angle is divided by every 45 degrees. Namely, the verticality is a value indicating a degree of displacement between the outer diameter portion and the inner diameter portion of the ground joint surface with respect to a completely horizontal surface. As the verticality becomes larger, the high portion of the ground joint surface is pressed. Thus, the crack and the peeling is considered to occur easily and such a state is not preferable.

The completed pair of glass-made hollow hemispherical bodies were fitted with each other at the ground joint surfaces (i.e., equatorial planes), and then the pressure of inside the glass sphere was reduced to approximately 800 Pa from a hole portion. A butyl rubber tape and a vinyl chloride tape were wound around a joint portion of the ground joint surfaces in one turn to fix the joint portion. As explained above, the pressure-resistant glass sphere of the present invention was manufactured and subjected to a pressurization test. Note that the hole portion used for the above described depressurization has a diameter of approximately 5 mm and is formed by using a perforating drill. After the cables required for the observation or the like are inserted, the hole portion is sealed by fastening bolt and nut via an O-ring.

Embodiment 1

In the above described FIG. 2, in the pressure-resistant glass sphere having an outer diameter of 330 mm and a thickness of the spherical shell of 17 mm, the thickness of two glass-made hollow hemispherical bodies is made thicker by 0.5 mm outward from the outer diameter and by 0.5 mm inward from the inner diameter over the width of approximately 15 mm from the equatorial plane 13 (i.e., ground joint surfaces 12). Accordingly, the thickness of the spherical shell 14 is thicker totally by 1 mm at the equatorial plane portion 11 than the portion other than the equatorial plane portion. At the inner diameter side, the thickness of the spherical shell is gradually increased by 0.5 mm from the portion other than the equatorial plane portion at a curvature of 95 mm. At the outer diameter side, the thickness of the spherical shell is gradually increased by 0.5 mm at a curvature of 30 mm. The width of the ground joint surfaces 12 is 17.68 mm. The ground joint surfaces were polished until the surface roughness became 0.5 μm or less by using emery having a number (particle size) of 1000. In order to remove defects existing at the edge portions of the glass, the outer edge portion was polished by the width of 0.5 mm and the inner edge portion was polished by the width of 0.3 mm using a polishing belt having a number (particle size) of 600.

The surface accuracy and the like of the ground joint surfaces 12 were measured by using the above described methods. Consequently, the surface roughness Ra of the ground joint surfaces was 0.157 μm, the PV value was 7.9 and the verticality was 0.1 to 1.5 μm at eight points on the entire periphery.

The pair of glass-made hollow hemispherical bodies obtained as described above were fitted with each other at the ground joint surfaces 12, and a band made of rubber was wound outside the equatorial plane portion 11 to fix them. Thus, the pressure-resistant glass sphere was prepared. Buffer materials such as an adhesive agent was not used at the ground joint surfaces.

The example of the present embodiment has a configuration corresponds to No. 4 in the later described Table 1. The weight of the pressure-resistant glass sphere is 12.48 kgf, the buoyancy is 19.24 kgf and the floating force obtained by subtracting the weight from the buoyancy is 6.76 kgf. In No. 21 of Table 1 where the thickness of the spherical shell is specified to be constantly 18 mm, the weight is 13.06 kgf, the buoyancy is 19.23 kgf and the floating force is 6.17 kgf. Thus, the floating force is increased by 0.59 kgf by using the configuration of the present embodiment.

Two kinds of pressure resistance tests were performed on the above described pressure-resistant glass sphere.

The first test is a simple pressurization test under 120 MPa which corresponds to the water pressure at the water depth of 12,000 m. The pressure was increased from normal pressure to 120 MPa in 20 minutes, the pressure was kept at 120 MPA for 20 minutes, and then the pressure was returned to the normal pressure in 20 minutes. Then, the ground joint surfaces of the pressure-resistant glass sphere were observed and it was confirmed that the crack and the peeling did not occur.

The second test is a repeated pressurization test. In the repeated pressurization test, as one cycle, the pressure was increased to the maximum ultimate pressure of 114 MPa in 15 minutes and then returned to the normal pressure in 15 minutes. The above described cycle was repeated seven times. Consequently, the present invention shown in FIG. 2 could withstand the test. The ground joint surfaces were observed after the test, and the occurrence of the crack and the peeling leading to the breakage and the collapse could not be confirmed.

Other Embodiments and Comparative Examples

Summarized results of embodiments and comparative examples are shown in Table. 1. In the table, the maximum tensile stress F (MPa) generated at the inner edge portion of the spherical shell is calculated when the pressure of 120 MPa is applied. The calculation was made by using the software named as SOLIDWORKS manufactured by DAS-SAULT SYSTEMES. This software can calculate the stress generated at each portion of the pressure-resistant glass sphere when the pressure-resistant glass sphere receives the pressure corresponding to the water depth of the deep sea.

When the external pressure corresponding to the water depth acts on the pressure-resistant glass sphere, stress is generated at the ground joint surfaces of the spherical shell. As described above, the maximum tensile stress F is generated at the inner edge portion and the glass sphere is collapsed and broken when the stress exceeds the strength of the pressure-resistant glass sphere. Accordingly, when the maximum tensile stress generated at the inner edge portion is small under the action of the external pressure, the pressure resistance can be said to be high.

The dimension shown as "X" in Table 1 is a thickness to be made thicker inward from the inner diameter and outward from the outer diameter in the equatorial plane portion. Y" is a width of the portion to be made thicker. The dimension measured from the ground joint surfaces is described. "Inner R" is a curvature for gradually increasing the thickness of the equatorial plane portion from the portion other than the equatorial plane portion at the inner diameter side. "Outer R" is a curvature for gradually increasing the thickness of the equatorial plane portion from the portion other than the equatorial plane portion at the outer diameter side and converging the increase of the thickness.

For the reference, Table 1 shows a volume, an outer diameter volume, and a weight of the pressure-resistant glass sphere. Table 1 further shows a buoyancy calculated from the outer diameter and shows a floating force calculated from the difference between the buoyancy and the weight. Here, a specific weight of the glass is calculated as 2.35 and a specific weight of seawater is calculated as 1.02.

TABLE 1

| | 13 inch - 17 mm base thickness | | | | | | | | | |
|---|---|---|---|---|---|---|---|---|---|---|
| No. | X (mm) inner | X (mm) outer | Y (mm) (inner base) | inner R (mm) | outer R (two points) (mm) | maximum tensile stress F (MPa) at inner edge portion | volume of glass sphere (cm³) | outer diameter volume of glass sphere (cm³) | weight of entire glass sphere (kgf) | buoyancy of entire glass sphere (kgf) | floating force per one glass (kgf) |
| 1 | 0.25 | 0.25 | 9 | 145 | 30 | 109 | 2651 | 9427 | 12.46 | 19.23 | 6.77 |
| 2 | 0.50 | 0.50 | 9 | 146 | | 91 | 2668 | 9428 | 12.54 | 19.23 | 6.70 |
| 3 | 0.25 | 0.25 | 15 | 48 | | 82 | 2649 | 9429 | 12.45 | 19.23 | 6.79 |
| 4 | 0.50 | 0.50 | | 95 | | 95 | 2656 | 9431 | 12.48 | 19.24 | 6.76 |
| 5 | 1.00 | 1.00 | | 122 | | 81 | 2675 | 9436 | 12.57 | 19.25 | 6.68 |
| 6 | 0.25 | 0.00 | | 48 | | 124 | 2645 | 9425 | 12.43 | 19.23 | 6.79 |
| 7 | 0.50 | 0.00 | | 95 | | 82 | 2650 | 9425 | 12.46 | 19.23 | 6.77 |
| 8 | 1.00 | 0.00 | | 122 | | 96 | 2664 | 9425 | 12.52 | 19.23 | 6.71 |
| 9 | 0.00 | 0.50 | | | 30 | 94 | 2648 | 9431 | 12.45 | 19.24 | 6.79 |
| 10 | 0.00 | 1.00 | | | | 103 | 2653 | 9436 | 12.47 | 19.25 | 6.78 |
| 11 | 0.25 | 0.25 | 30 | 95 | 30 | 76 | 2658 | 9433 | 12.49 | 19.24 | 6.75 |
| 12 | 0.50 | 0.50 | | | | 96 | 2674 | 9439 | 12.57 | 19.26 | 6.69 |
| 13 | 1.00 | 1.00 | | | | 90 | 2707 | 9451 | 12.72 | 19.28 | 6.56 |
| 14 | 0.25 | 0.25 | 65 | | | 78 | 2674 | 9441 | 12.57 | 19.26 | 6.69 |
| 15 | 0.50 | 0.50 | | | | 95 | 2706 | 9456 | 12.72 | 19.29 | 6.57 |
| 16 | 1.00 | 1.00 | | | | 81 | 2772 | 9486 | 13.03 | 19.35 | 6.32 |
| 17 | 0.25 | 0.25 | 130 | | | 138 | 2699 | 9455 | 12.68 | 19.29 | 6.60 |
| 18 | 0.50 | 0.50 | | | | 168 | 2756 | 9483 | 12.95 | 19.35 | 6.39 |
| 19 | 1.00 | 1.00 | | | | 91 | 2870 | 9541 | 12.49 | 19.46 | 5.97 |
| 20 | 17 mm constant thickness | | | | | 116 | 2642 | 9525 | 12.42 | 19.23 | 6.81 |
| 21 | 18 mm constant thickness | | | | | 93 | 2779 | 9425 | 13.06 | 19.23 | 6.17 |
| 22 | 19 mm constant thickness | | | | | 91 | 2914 | 9425 | 13.69 | 19.23 | 5.53 |

In Table 1, the embodiment 1, which is the configuration shown as No. 4, passed the simple pressurization test and the repeated pressurization test corresponding to the water depth of 12,000 m. In the embodiment 1, the thickness of the spherical shell of the equatorial plane portion of the glass-made hollow hemispherical bodies is made thicker by 0.5 mm inward from the inner diameter than the thickness of the spherical shell of the portion other than the equatorial plane portion over the width (Y) of 15 mm from the ground joint surfaces. The thick part is formed inside the inner diameter to have a curvature radius (inner R) of 95 mm from the spherical shell of the portion other than the equatorial plane portion. In addition, the thickness of the equatorial plane portion is made thicker also at the outside of the outer diameter by 0.5 mm. The thick part of the equatorial plane portion is formed to have a curvature radius (outer R) of 30 mm from the spherical shell of the portion other than the equatorial plane portion.

Figure 4:
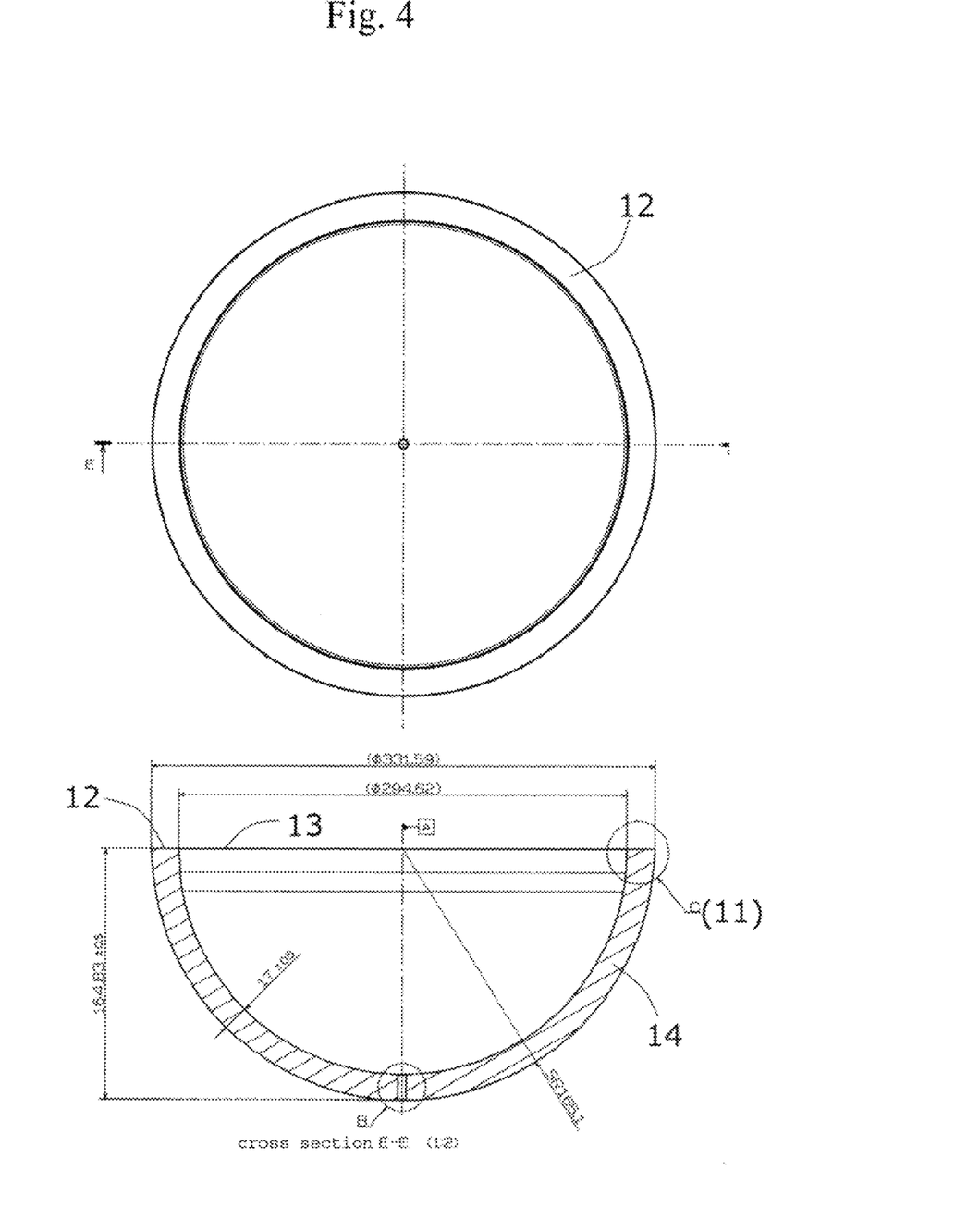
FIG. 4 is an entire design drawing of the pressure-resistant glass sphere (embodiment 1) of the present invention.

A design drawing of the glass-made hollow hemispherical bodies of the embodiment 1 is shown in FIG. 4. The pressure-resistant glass sphere of the present invention can be obtained by fitting a pair of glass-made hollow hemispherical bodies with each other at the ground joint surfaces 12 (i.e., joining surface). The thickness of the spherical shell 14 is 17±0.5 mm at the portion other than the equatorial plane portion as a design value. The outer diameter is 330.2 mm as the outer radius is described as 165.1 mm. The hole portion is formed on the top to insert the cables required for the observation. The structure of the equatorial plane portion 11 (portion shown as C) is shown in FIG. 5 by enlarging it.

Figure 5:
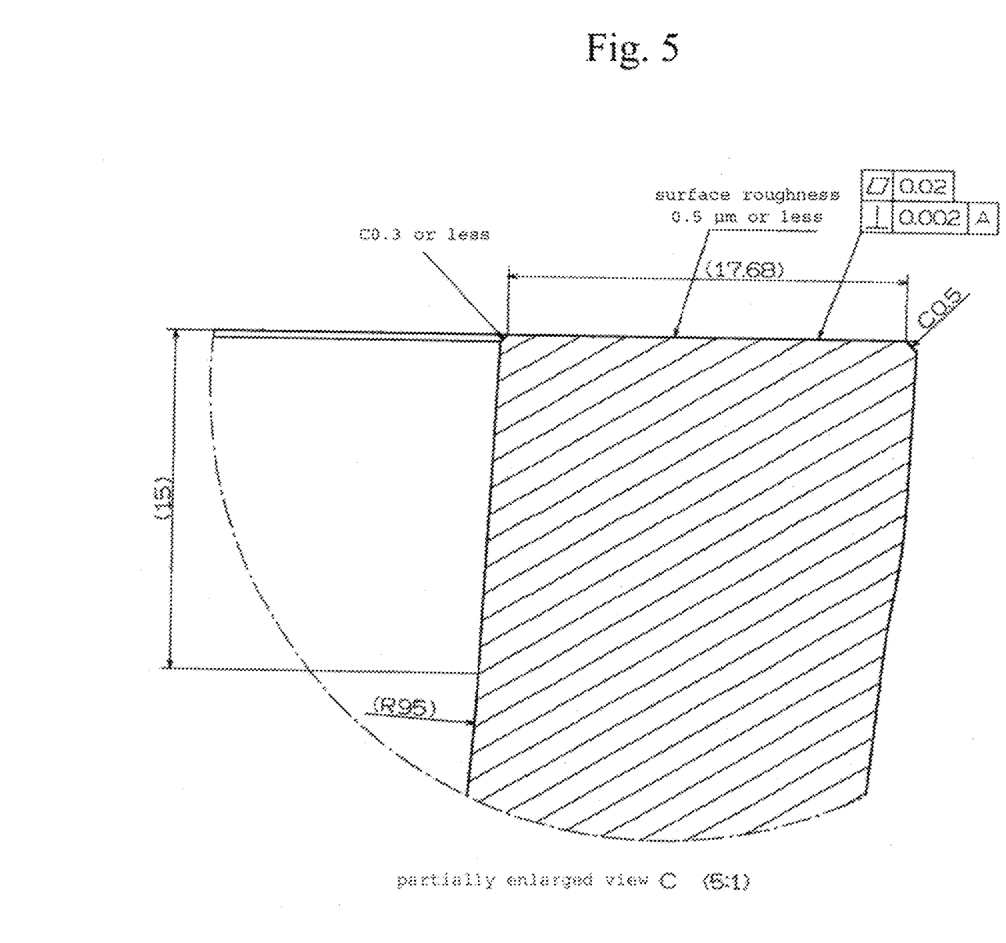
FIG. 5 is an enlarged view of Part C shown in FIG. 4. Processing accuracy of the ground joint surfaces is shown in FIG. 5.

FIG. 5 shows the state of the surface finishing of the ground joint surface 12. As described above, precision polishing is performed on the ground joint surface by using fine emery having a number (particle size) of approximately 1000 until the surface roughness becomes 0.5 μm or less. The processing is made so that the PV value becomes 20 μm or less and the verticality becomes 2 μm or less. On the end portions of the ground joint surface, thread chamfering of the width of 0.3 mm or less is performed at the inner edge and thread chamfering of the width of approximately 0.5 mm is performed at the outer edge.

Figure 6:
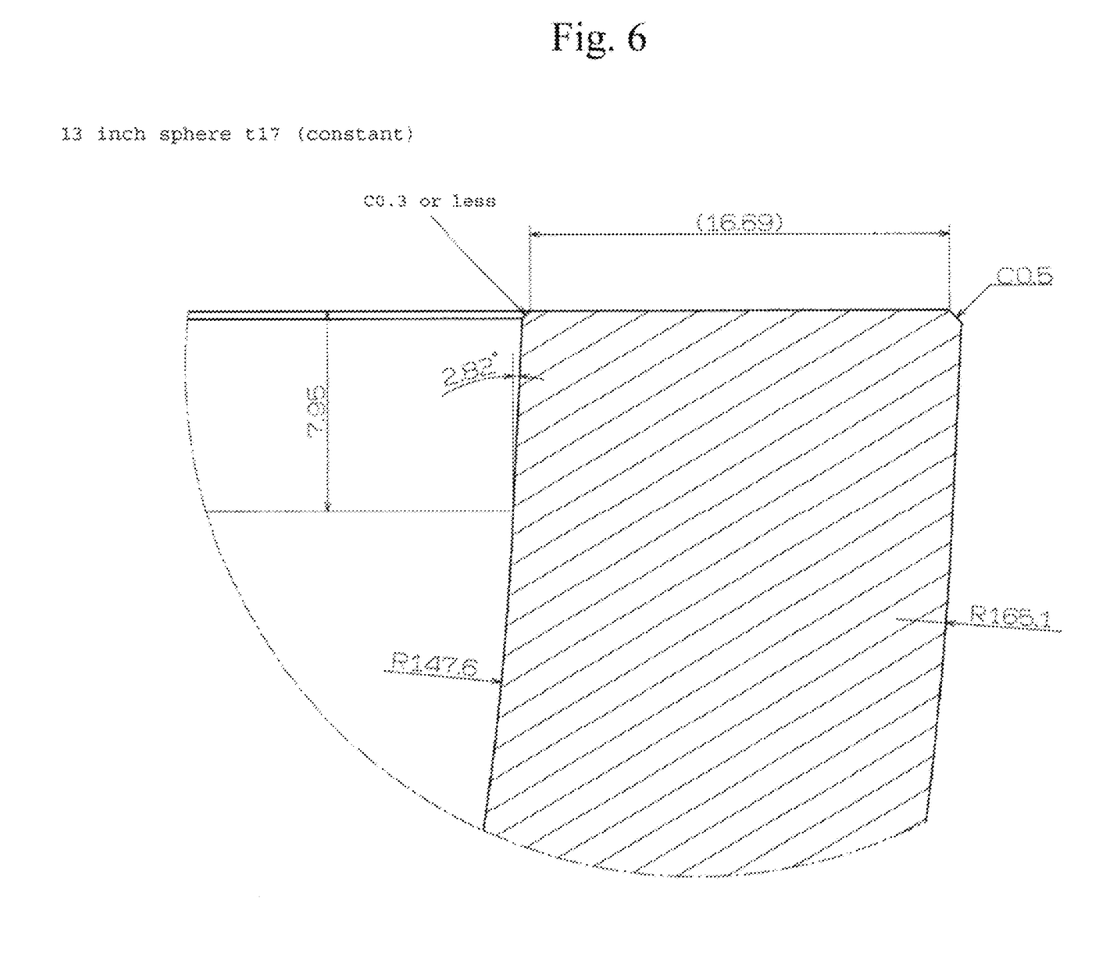
FIG. 6 is a design drawing of the pressure-resistant glass sphere where the thickness of the spherical shell is constantly 17 mm (comparative example).

No. 20 is a comparative example showing the pressure-resistant glass sphere having an outer diameter of 330 mm and a constant thickness of the spherical shell of 17 mm. The configuration of No. 20 is shown in FIG. 6. Since the thick part of the equatorial plane portion is not provided, the width of the ground joint surfaces of a pair of glass-made hollow hemispherical bodies is 16.69 mm which is shorter by 1 mm than the embodiment 1 shown in FIG. 2. In FIG. 2 and FIG. 6, the outer diameter of the glass-made hollow hemispherical bodies is 165.1 mm and the inner diameter is 147.6 mm. Therefore, the thickness of the spherical shell of the portion other than the equatorial plane portion is 17.5 mm.

Both No. 21 and No. 22 are comparative examples. No. 21 is the pressure-resistant glass sphere having a constant thickness of the spherical shell of 18 mm. No. 22 is the pressure-resistant glass sphere having a constant thickness of the spherical shell of 19 mm.

In No. 4 (i.e., embodiment 1), the value of the maximum tensile stress generated at the inner edge portion is 95 MPa, which is extremely smaller than 116 MPa which is the maximum tensile stress of No. 20 (i.e., comparative example). The maximum tensile stress of No. 4 is equivalent to those of No. 21 and No. 22. From the above, it is revealed that thickening of the equatorial plane portion has the same effect compared to the case where the thickness of the spherical shell is constantly made thicker.

Summarizing from the point of view of the weight and the floating force, it is also revealed that the weight of the pressure-resistant glass sphere is 12.48 kgf, the buoyancy is 19.24 kgf and the floating force is 6.76 kgf in No. 4. In No. 21, the floating force is 6.17 kgf which is smaller by 0.59 kgf than No. 4. In No. 22, the floating force is 5.53 kgf which is smaller as much as 1.23 kgf than No. 4.

In Table 1, the configurations capable of suppressing the tensile stress generated at the inner edge portion of the ground joint surface approximately the same as or smaller than No. 4 (embodiment 1) are No. 2, 3, 5, 7-9, 11-16 and 19. Among them, No. 13, 15, 16 and 19 have a disadvantage that the floating force is smaller than No. 4, same as No. 21 and 22. Thus, No. 13, 15, 16 and 19 are not preferable.

From the above results, it is proved that it is important to make at least one of the outside of the outer diameter and the inside of the inner diameter of the spherical shell of the equatorial plane portion thicker so that the thickness is thicker totally by 0.5 mm or more in order to obtain the pressure-resistant glass sphere capable of withstanding the pressure of 120 MPa, having the pressure resistance almost equivalent to the pressure-resistant glass sphere having an outer diameter of 330 mm and a thickness of the spherical shell of 18 mm and having the floating force almost equivalent to No. 20 even though the thickness of the spherical shell of the portion other than the equatorial plane portion is 17 mm.

The width Y of the equatorial plane portion to be thickened is appropriately 9 mm or more and 130 mm or less, desirably 9 mm or more and 65 mm or less. Even if the width is thicker more than 130 mm, there is no advantage for increasing the strength. On the contrary, there is a greater disadvantage of reducing the floating force.

The inner R and the outer R shown in Table 1 have an insignificant effect on the strength and the floating force. Thus, it is considered that it is enough if the thick part of the equatorial plane portion is smoothly formed from the portion other than the equatorial plane portion.

Figure 7:
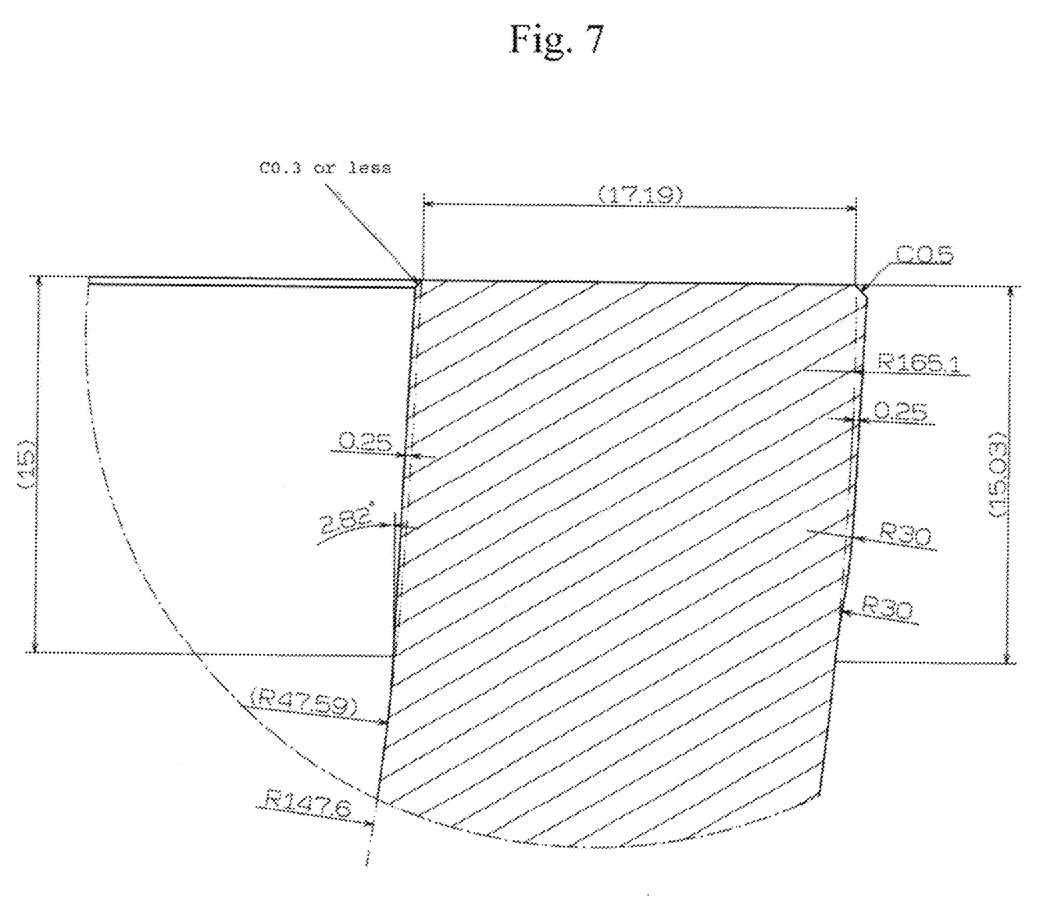
FIG. 7 is a design drawing of another example of the embodiment of the present invention.

FIG. 7 is one of the configurations of the present invention where the thickness is made thicker by 0.25 mm inward from the inner diameter, by 0.25 mm outward from the outer diameter, and totally by 0.5 mm at the equatorial plane portion. FIG. 7 corresponds to No. 3 in Table 1. In this configuration, the width of the ground joint surfaces is 17.19 mm and the maximum tensile stress generated at the inner edge portion is 82 MPa which is smaller than that of the embodiment 1. In addition, the floating force is 6.79 kgf. The floating force is increased by 0.62 kgf compared to the configuration of No. 21 where the thickness of the entire spherical shell is 18 mm.

Figure 8:
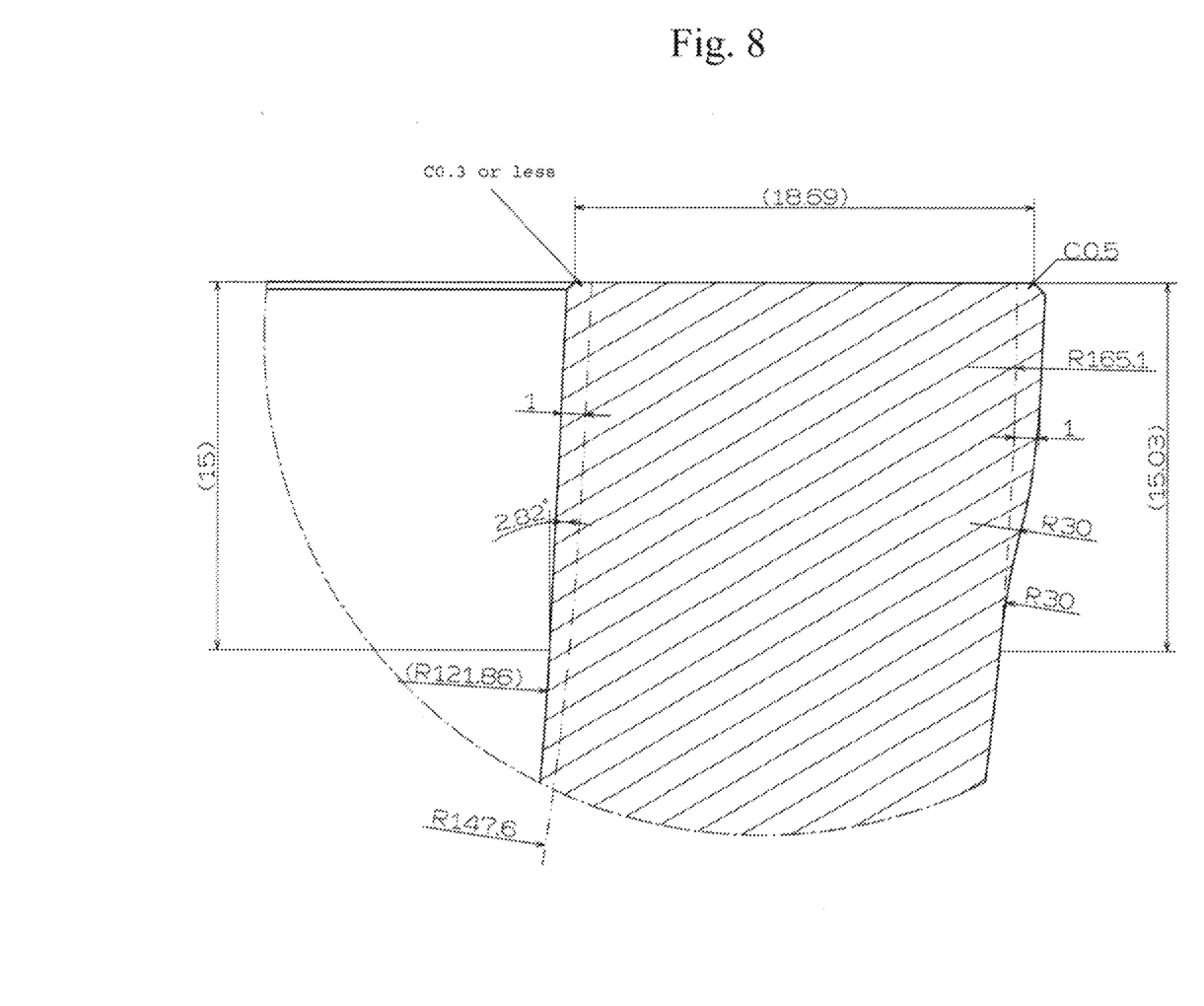
FIG. 8 is a design drawing of another example of the embodiment of the present invention.

FIG. 8 is one of the configurations of the present invention where the thickness is made thicker by 1.0 mm inward from the inner diameter, by 1.0 mm outward from the outer diameter, and totally by 2.0 mm at the equatorial plane portion. FIG. 8 corresponds to No. 5 in Table 1. In this configuration, the width of the ground joint surfaces is 18.69 mm and the maximum tensile stress generated at the inner edge portion is 81 MPa which is smaller than that of the embodiment 1. In addition, the floating force is 6.68 kgf. The floating force is increased by 1.15 kgf compared to the configuration of No. 22 where the thickness of the spherical shell is constantly 19 mm. However, judging from the configurations of No. 13, 16 and 19, even when the thickness is increased by more than 1 mm at the outer diameter side or the inner diameter side, it is considered that there is not a great advantage for increasing the strength. On the contrary, there is a disadvantage of reducing the floating force.

The above described results show that the pressure resistance can be increased while keeping advantage in the viewpoint of the floating force by increasing the thickness of the spherical shell only at the equatorial plane portion near the ground joint surfaces and keeping the thickness of the spherical shell of the portion other than the equatorial plane portion in the pressure-resistant glass sphere having an outer diameter of 330 mm and a thickness of the spherical shell of 17 mm.

It is proved that the same concept can be applied not only to the pressure-resistant glass sphere having an outer diameter of 330 mm but also to the pressure-resistant glass sphere having an outer diameter of 250 mm and the pressure-resistant glass sphere having an outer diameter of 432 mm. Calculation results obtained by simulation are shown in Table 2. Same as the calculation shown in Table 1, the simulation was made by using the software named as SOLIDWORKS manufactured by DASSAULT SYSTEMES.

IS-10000-10 shown in Non-Patent Document 4) having an outer diameter of 250 mm assumed to be used at the water depth of 10,000 m. No. 4 shown in Table 2 is the pressure-resistant glass sphere having the same configuration as NMS-IS-10000-10. In this configuration, when the external pressure of 90 MPa which corresponds to the water depth of 9,000 m is applied, the value of the maximum tensile stress

TABLE 2

| Note | base thickness | No. | X (mm) inner | X (mm) outer | Y (mm) (inner base) | outer R (two points) (mm) | inner R (mm) | maximum tensile stress F (MPa) at inner edge portion | volume of glass sphere (cm³) | outer diameter volume of glass sphere (cm³) | weight of entire glass sphere (kgf) | buoyancy of entire glass sphere (kgf) | floating force per one glass (kgf) |
|---|---|---|---|---|---|---|---|---|---|---|---|---|---|
| 17 inch/ 432 mm app. 12000 m ex. pressure 120 MPa | 19 mm | 1 | 1.00 | 1.00 | 15 | 172 | 30 | 88 | 5138 | 21091 | 24.15 | 43.03 | 18.88 |
|  |  | 2 | 21 mm constant thickness |  |  |  |  | 94 | 5571 | 21078 | 26.18 | 43.00 | 16.82 |
| 10 inch/ 250 mm app. 9000 m ex. pressure 90 MPa | 8 mm | 3 | 0.50 | 0.50 | 15 | 69 | 30 | 95 | 771 | 4295 | 3.62 | 8.76 | 5.14 |
|  |  | 4 | 9 mm constant thickness |  |  |  |  | 100 | 849 | 4291 | 3.99 | 8.75 | 4.76 |
|  |  | 5 | 10 mm constant thickness |  |  |  |  | 90 | 935 | 4291 | 4.40 | 8.75 | 4.36 |
| 13 inch/ 330 mm app. 12000 m ex. pressure 120 MPa | 16 mm | 6 | 0.50 | 0.50 | 15 | 96 | 30 | 81 | 2518 | 9428 | 11.83 | 19.23 | 7.40 |
|  |  | 7 | 1.50 | 0.50 |  | 131 | 30 | 86 | 2553 | 9427 | 12.00 | 19.23 | 7.23 |
|  |  | 8 | 17 mm constant thickness |  |  |  |  | 116 | 2642 | 9425 | 12.42 | 19.23 | 6.81 |
|  |  | 9 | 18 mm constant thickness |  |  |  |  | 93 | 2779 | 9425 | 13.06 | 19.23 | 6.17 |
| 13 inch/ 330 mm app. 7000 m ex. pressure 70 MPa | 11 mm | 10 | 0.50 | 0.50 | 15 | 106 | 30 | 76 | 1798 | 9428 | 8.45 | 19.23 | 10.78 |
|  |  | 11 | 12 mm constant thickness |  |  |  |  | 59 | 1931 | 9425 | 9.08 | 19.23 | 10.15 |
| 17 inch/ 432 mm app. 6700 m ex. pressure 67 MPa | 13 mm | 12 | 0.50 | 0.50 | 15 | 153 | 30 | 73 | 3602 | 21086 | 16.93 | 43.01 | 26.09 |
|  |  | 13 | 14 mm constant thickness |  |  |  |  | 100 | 3840 | 21078 | 18.05 | 43.00 | 24.95 |

For example, the thickness of the spherical shell is constantly 12 mm (corresponding to No. 11 in Table 2) in the pressure-resistant glass sphere (NMS-IS-7000-13 shown in Non-Patent Document 4) having an outer diameter of 330 mm used for the exploration and searching at the deep sea of approximately 7,000 m. However, when the concept of the preset invention is applied, the same pressure resistance can be obtained and the floating force can be increased by 0.63 kgf by using the thickness of the spherical shell of 11 mm and making the thickness thicker by 0.5 mm at the outer diameter side and by 0.5 mm at the inner diameter side over the width of 15 mm of the equatorial plane portion.

Alternatively, the thickness of the spherical shell is constantly 14 mm (corresponding to No. 13 in Table 2) in the pressure-resistant glass sphere (SPHERE MODEL 2040-17V shown in Non-Patent Document 3 and NMS-IS-6700-17 shown in Non-Patent Document 4) having an outer diameter of 432 mm assumed to be used at the water depth of 6,700 m. However, when the concept of the preset invention is applied, the pressure resistance can be increased and the floating force can be increased by 1.14 kgf by using the thickness of the spherical shell of 13 mm and making the thickness thicker by 0.50 mm at the outer diameter side and by 0.50 mm at the inner diameter side over the width of 15 mm of the equatorial plane portion (i.e., ground joint surfaces).

Alternatively, the thickness of the spherical shell is constantly 9 mm in the pressure-resistant glass sphere (NMSgenerated at the inner edge portion reaches 100 MPa. When the concept of the preset invention is applied, the same pressure resistance can be obtained as the spherical shell having a constant thickness of 10 mm (corresponding to No. 5 in Table 2) and the floating force can be increased by 0.78 kgf by using the thickness of the spherical shell of 8 mm and making the thickness thicker by 0.5 mm at the outer diameter side and by 0.5 mm at the inner diameter side over the width of 15 mm of the equatorial plane portion (i.e., ground joint surfaces).

Furthermore, the thickness of the spherical shell is constantly 21 mm (corresponding to No. 2 in Table 2) in the pressure-resistant glass sphere (NMS-IS-12000-17 shown in Non-Patent Document 4) having an outer diameter of 432 mm assumed to be used at the water depth of 12,000 m. However, when the concept of the preset invention is applied, the same or greater pressure resistance can be obtained as No. 2 shown in Table 2 and the floating force can be increased by 2.06 kgf by using the thickness of the spherical shell of 19 mm and making the thickness thicker by 1.0 mm at the outer diameter side and by 1.0 mm at the inner diameter side over the width of 15 mm of the equatorial plane portion (i.e., ground joint surfaces).

The pressure-resistant glass sphere having an outer diameter of 330 mm assumed to be used at the water depth of 12,000 m is not found in the market. In the thick glass sphere having a constant thickness of 17 mm shown as No. 8 in Table 2, the maximum tensile stress generated at the inner edge portion is 116 MPa. Thus, the pressure resistance is not sufficient. On the other hand, in the thick glass sphere having a constant thickness of 18 mm shown as No. 9 in Table 2, the maximum tensile stress generated at the inner edge portion can be reduced to 93 MPa. However, the floating force is reduced by 0.64 kg compared to the thick glass sphere having a constant thickness of 17 mm.

When the concept of the preset invention is applied, the same or greater pressure resistance can be obtained as No. 9 shown in Table 2 and the floating force can be increased by 1.23 kgf by using the thickness of the spherical shell of 16 mm and making the thickness thicker by 0.5 mm at the outer diameter side and by 0.5 mm at the inner diameter side (No. 6 in Table 2) over the width of 15 mm of the equatorial plane portion (i.e., ground joint surfaces).

Figure 9:
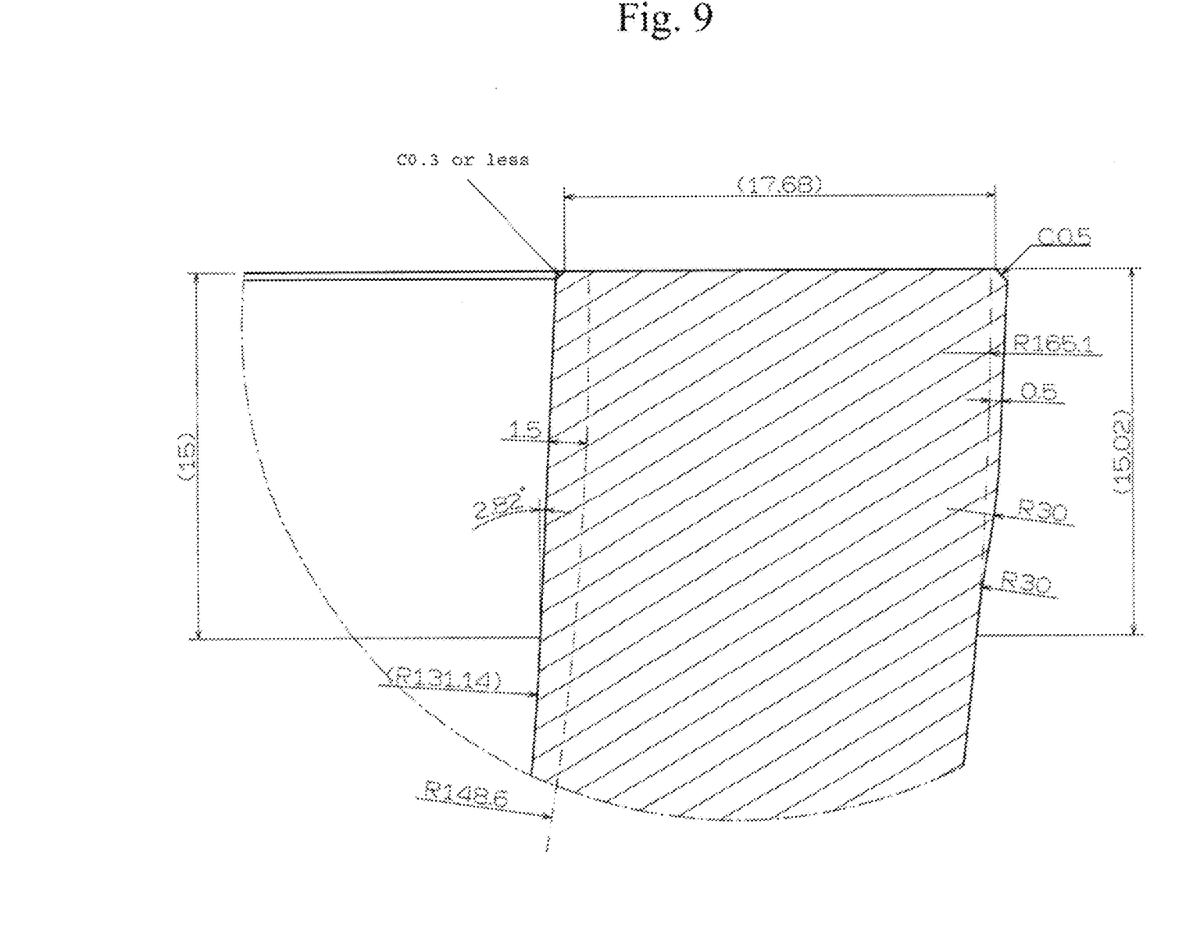
FIG. 9 is a design drawing showing a configuration of the pressure-resistant glass sphere described in claim 6 of the present invention.

As a similar case, the same or greater pressure resistance can be obtained as No. 9 shown in Table 2 and the floating force can be increased by 1.06 kgf by using the thickness of the spherical shell of 16 mm and making the thickness thicker by 0.5 mm at the outer diameter side and by 1.5 mm at the inner diameter side (No. 7 in Table 2) over the width of 15 mm of the equatorial plane portion (i.e., ground joint surfaces). A design drawing of the pressure-resistant glass sphere of the above described configuration is shown in FIG. 9.

Note that, this invention is not limited to the above-mentioned embodiments. Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

While the invention has been particularly shown and described with respect to preferred embodiments thereof, it should be understood by those skilled in the art that the foregoing and other changes in form and detail may be made therein without departing from the spirit and scope of the invention as defined in the appended claims.

DESCRIPTION OF THE REFERENCE NUMERALS 11 equatorial plane portion
12 ground joint surfaces (joining surface)
13 equatorial plane
14 spherical shell

What is claimed is:

1. A pressure-resistant glass sphere comprising:
a pair of glass-made hollow hemispherical bodies, the glass-made hollow hemispherical bodies being joined with each other at ground joint surfaces located on an equatorial plane of the pressure-resistant glass sphere so that the ground joint surfaces serve as a joining surface, wherein
a thickness of a spherical shell of the glass-made hollow hemispherical bodies is thicker totally by 0.5 mm or more outward from an outer diameter and inward from an inner diameter at an equatorial plane portion than a portion other than the equatorial plane portion, the equatorial plane portion having a width of 9 mm or more and 130 mm or less from the ground joint surfaces,
an average surface roughness Ra of the ground joint surfaces is 0.5 µm or less, a PV value of the ground joint surfaces is 20 µm or less and a verticality of the ground joint surfaces is 2 µm or less, the PV value indicating a flatness, and
the ground joint surfaces are directly joined with each other.

2. The pressure-resistant glass sphere according to claim 1, wherein
an outer diameter of the glass-made hollow hemispherical bodies is 330 mm, and
the thickness of the spherical shell of the portion other than the equatorial plane portion is 17 mm.

3. The pressure-resistant glass sphere according to claim 1, wherein
an outer diameter of the glass-made hollow hemispherical bodies is 432 mm, and
the thickness of the spherical shell of the portion other than the equatorial plane portion is 19 mm.

4. The pressure-resistant glass sphere according to claim 1, wherein
an outer diameter of the glass-made hollow hemispherical bodies is 250 mm, and
the thickness of the spherical shell of the portion other than the equatorial plane portion is 8 mm.

5. The pressure-resistant glass sphere according to claim 1, wherein
an outer diameter of the glass-made hollow hemispherical bodies is 330 mm,
the thickness of the spherical shell of the portion other than the equatorial plane portion is 16 mm, and
the thickness of the spherical shell of the equatorial plane portion is thicker by 0.5 mm or more outward from the outer diameter and thicker by 0.5 mm or more inward from the inner diameter.

* * * * *